3,679,628
THERMOPLASTIC POLYESTER MOULDING COMPOSITIONS CONTAINING BORON NITRIDE
Ludwig Brinkmann and Walter Herwig, Frankfurt am Main, Germany, assignors to Farbwerke Hoechst Aktiengesellschaft vormals Meister Lucius & Bruning, Frankfurt am Main, Germany
No Drawing. Filed July 22, 1970, Ser. No. 57,312
Claims priority, application Germany, July 29, 1969, P 19 38 436.2
Int. Cl. C08g 39/10, 51/10
U.S. Cl. 260—45.7 PS                    13 Claims

ABSTRACT OF THE DISCLOSURE

Polyester compositions suitable for injection moulding are provided which do not exhibit discoloration or discolor to a minor extent only during manufacturing and processing. The compositions consist of linear saturated polyesters, boron nitride and compounds containing S—O—Na or P—O—Na groups in their chemical structure.

---

The present invention relates to polyester moulding compositions containing boron nitride and having improved properties, especially as regards coloration.

It has been proposed to produce partially crystalline shaped articles by injection moulding polyesters of aromatic dicarboxylic acids and aliphatic or cycloaliphatic diols. Injection moulding of polyethyleneglycol terephthalate has become of considerable technical importance. Shaped articles made of polyesters should have a relatively high degree of crystallization because a high degree of crystallization guarantees hardness, dimensional stability and stability of shape even at high temperatures. The high degree of crystallization should be obtained as rapidly as possible as in injection moulding the dwell time in the mould is part of the injection cycle, the duration of which determines, inter alia, the economy of the process. Owing to the fact that polyesters without additive crystallize relatively slowly, it is necessary to modify the polyester moulding composition with an agent promoting crystallization and to heat the mould at an appropriate temperature.

To promote the crystallization of polyethyleneglycol terephthalate it has been proposed to add finely divided inorganic substances. Substances of this type which are called nucleating agents should have a grain size below 2 microns. As nucleating agent having good properties boron nitride has been proposed.

Polyesters that have been modified with boron nitride as nucleating agent have, however, the drawback that they are frequently discolored to a considerable extent. The discoloration does not detrimentally affect the mechanical properties of the shaped articles made from the said polyesters, but in many cases it is not desired.

The present invention provides thermoplastic moulding compositions consisting of a mixture of:

(a) Linear saturated polyesters of aromatic dicarboxylic acids and optionally up to 10% by weight of aliphatic dicarboxylic acids, calculated on the total amount of carboxylic acids, with saturated aliphatic or cycloaliphatic diols, (b) 0.005 to 5% by weight, preferably 0.05 to 0.5% by weight of boron nitride, calculated on the total mixture and (c) Compounds containing as structural units S—O—Na or P—O—Na groups in an amount of from 0.005 to 5% by weight, preferably 0.1 to 1% by weight, calculated on the total mixture, which moulding compositions have improved color properties.

It is surprising that the polyester moulding compositions of the invention do not exhibit discoloration or discolor to a minor extent only during their manufacture and processing. The addition of compounds containing S—O—Na or P—O—Na groups considerably improves the color of polyester moulding compositions containing boron nitride as a nucleating agent.

The boron nitride used for making the polyester moulding compositions should have a particle size below 10 microns, preferably below 2 microns. The boron nitride used is prepared by known methods. It is expedient to heat the boron nitride before using it for 1 to 24 hours at a temperature ranging from 800° C. to the sublimation temperature of the boron nitride.

In the compounds containing S—O—Na groups the sulfur can be bivalent, tetravalent, or hexavalent, compounds containing hexavalent sulfur being preferred. Especially good results are obtained with compounds containing $SO_3$.Na groups. Suitable compounds are, for example, sodium sulfate, sodium alkane-sulfonates, sodium olefin-sulfonates, sodium aryl-sulfonates or sodium aralkyl-sulfonates.

In the sodium alkane-sulfonates the alkyl radicals may contain 1 to 30 carbon atoms and the chains of carbon atoms may be straight or branched. The $SO_3Na$ groups can be bound at any point of the carbon chain. In the case of sodium olefin-sulfonates the olefin radical may contain 1 to 30 carbon atoms in a straight or branched chain, the double bond may be at any point of the carbon chain and the $SO_3Na$ group may be bound at any point of the carbon chain. The sodium aryl-sulfonates may contain 1 to 3 aromatic nuclei.

Suitable compounds are, for example the sodium salts of the following sulfonic acids: benzene-sulfonic acid, naphthalene-1-sulfonic acid, naphthalene-2,6-disulfonic acid, diphenyl-4-sulfonic acid or diphenyl ether 4-sulfonic acid. The sodium aralkyl-sulfonates may contain 1 to 3 aromatic nuclei possibly carrying as substitutes alkyl groups having up to 25 carbon atoms. Aralkylsulfonates of this type are, for example, the sodium salts of the following sulfonic acids: p-toluene-sulfonic acid, 1,3-xylene-4-sulfonic acid or n-dodecylbenzene-4-sulfonic acid.

The phosphorus in the compounds containing

P—O—Na groups may be trivalent or pentavalent. Suitable compounds containing P—O—Na groups are for example, the sodium salts of alkyl-phosphinic acids, cycloalkyl-phosphinic acids, aryl-phosphinic acids, aryl-phosphonic acids, alkyl-phosphonic acids, cycloalkyl phosphonic acids, the sodium salts of a phosphorous acid monoalkyl ester, a phosphorous acid monocycloalkyl ester, a phosphorous acid monoaryl ester, a phosphoric acid dialkyl ester, a phosphoric acid dicycloalkyl ester, a phosphoric acid diaryl ester, the disodium salts of a phosphoric acid monoalkyl ester, a phosphoric acid monocycloalkyl ester, or a phosphoric acid monoaryl ester.

In the compounds containing P—O—Na groups and alkyl radicals the latter may have 1 to 30 carbon atoms in a straight or branched chain. The P—O—Na groups may be bound at any point of the carbon chain. On the compounds containing P—O—Na groups and cycloalkyl radicals the number of carbon atoms in the ring is in the range of from 4 to 12 and the total number of carbon atoms of alkyl-substituted cycloalkanes may be up to 30. The alkyl substituents may have straight or branched chains. Compounds containing P—O—Na groups and aryl groups may have 1 to 3 aromatic nuclei optionally carrying alkyl groups having up to 25 carbon atoms in a straight or branched chain.

The compounds containing S—O—Na or P—O—Na groups can be used either individually or in admixture with one another.

The boron nitride and the compounds containing S—O—Na or P—O—Na groups can be mixed with the polyester in various ways. The boron nitride and the compounds containing S—O—Na or P—O—Na groups can be simultaneously added to the polyester or they can be added separately during the manufacture of the polyester. In the latter case it is advisable to incorporate the compounds containing S—O—Na or P—O—Na groups into the polyester before adding the boron nitride. It is possible for example, to mix the polyester granules or powder as uniformly as possible with the boron nitride and the compounds containing S—O—Na or P—O—Na groups, to melt the mixture in an extruder, to extrude the melt while cooling and to granulate again. Alternatively, the polyester granules can be coated with the boron nitride and the compound containing S—O—Na or P—O—Na groups, for example by rolling the components in a rotating vessel. In this case mixing is brought about by the screw of the injection moulding machine when shaped articles are made from the polyester moulding composition. It is likewise possible to mix the polyester granules or powder with the compound containing S—O—Na groups or P—O—Na groups, to melt the mixture on an extruder, to extrude the melt while cooling, to granulate and finally to cover the dried granules with boron nitride. Another way is to add the boron nitride and the compound containing S—O—Na groups or P—O—Na groups during the manufacture of the polyester, for example when the ester interchange is terminated.

As linear saturated polyesters of aromatic dicarboxylic acids, polyethyleneglycol terephthalate is preferably used. It is likewise possible to use other polyesters, for example polycyclohexane-1,4-dimethylol terephthalate.

It is also possible to use modified polyethyleneglycol terephthalates containing, besides terephthalic acid units, units of other aromatic or aliphatic dicarboxylic acids, for example isophthalic acid, naphthalene-2,6-dicarboxylic acid or adipic acid, in an amount of up to 10% by weight, calculated on the total amount of carboxylic acids. Furthermore, modified polyethyleneglycol terephthalates may be used which contain, besides ethylene glycol, other aliphatic diols, for example neopentyl glycol or butanediol-1,4, as alcoholic component.

To improve the impact strength of the polyesters, suitable polymers of high molecular weight may be added in known manner, such as copolymers of ethylene and vinyl acetate, of ethylene and acrylic esters or of butadiene and styrene.

The polyester in the finished mouldable composition should have a reduced specific viscosity of from 0.7 to 2.0, preferably 1.2 to 1.6 dl./g., measured at 25° C. in a 1% solution of the polyester in a mixture of 60 parts by weight of phenol and 40 parts by weight of tetrachloroethane. If the reduced specific viscosity of the polyester in the mouldable composition is too low, the composition can be subjected to an after-condensation in the solid phase in known manner. When the mouldable composition is produced by homogenization on an extruder a decomposition of the polyester and a reduction of the reduced specific viscosity should be taken into account when choosing the starting polyester.

The starting polyester as well as the polyester moulding composition should contain as little moisture as possible, preferably less than 0.02%. If desired, the granulated polyester moulding composition can be coated with a hydrophobic coating of a wax, paraffin or polyolefin wax.

To obtain injection moulded articles having a good degree of crystallization the temperature of the mould should be sufficiently above the second order transition temperature of the polyester. For a polyester moulding composition on the basis of a modified polyethyleneglycol terephthalate the temperature of the mould should be in the range of from 120 to 160° C.

The moulding compositions according to the invention permit high quality shaped articles having a high dimensional stability to be produced, for example gear wheels, bevel wheels, racks, coupling disks and guide numbers.

The following examples illustrate the invention.

EXAMPLE A (Comparative Example)

1 kilogram of polyethyleneglycol terephthalate granules having a reduced specific viscosity of 1.43 dl./g., measured at 25° C. in a 1% solution in a mixture of 60 parts by weight of phenol and 40 parts by weight of tetrachloroethane, was intensely mixed with 2 grams of boron nitride having a particle size below 2 microns which had been heated for 8 hours at 1,700° C., the mixture was melted in a vertical extruder, the melt was homogenized, extruded through a water bath while cooling and granulated. The granules having a reduced specific viscosity of 1.22 dl./g. were dried for 2 hours at 100° C. under a pressure of 0.3 mm. of mercury and then subjected to an after-condensation in the solid phase for 4 hours at 240° C. under a pressure of 0.3 mm. of mercury. The after-condensed polyester granules had a reduced specific viscosity of 1.42 dl./g.

From the granules obtained sheets having the dimensions 60 x 60 x 2 mm. were produced by injection moulding at a temperature of the mould of 140° C. and with a residence time or dwell time in the mould of 25 seconds. The color of the sheets was mist brown.

EXAMPLE 1

1 kilogram of polyethyleneglycol terephthalate having a reduced specific viscosity of 1.43 dl./g., measured at 25° C. in a 1% solution in a mixture of 60 parts by weight of phenol and 40 parts by weight of tetrachloroethane, was intensely mixed with 2 grams of boron nitride having a particle size of below 2 microns and 4 grams of anhydrous sodium sulfate having a particle size below 5 microns. Prior to its use the boron nitride had been heated for 8 hours at 1,700° C. The mixture was melted on a vertical extruder, the melt was homogenized, extruded while cooling in a water bath and granulated. The granules had a reduced specific viscosity of 1.2 dl./g. They were dried in a rotary evaporator for 2 hours at 100° C. under a pressure of 0.2 mm. of mercury. The granules were then subjected to an after-condensation in the solid phase for 4 hours at 240° C. under a pressure of 0.2 mm. of mercury. The polyester granules obtained had a reduced specific viscosity of 1.45 dl./g.

Sheets measuring 60 x 60 x 2 millimeters were produced from the granules by injection moulding at a temperature of the mould of 140° C. and with a dwell time in the mould of 25 seconds. The sheets had a white color with a slight greyish hue.

EXAMPLE 2

A mixture of 35 kilograms of terephthalic acid dimethyl ester, 27 kilograms of ethylene glycol and 17.4 grams of manganese-II-acetate (tetrahydrate) were heated to 175° C. while stirring. During the course of 4 hours the temperature was raised to 230° C. and the mixture was stirred until no more methanol distilled over. 210 grams of sodium alkane-sulfonate ($C_{13}$–$C_{18}$) were added, the melt was stirred for 15 minutes whereupon 12.7 grams of germanium phosphite were added. During the course of 150 minutes the temperature was raised to 278° C. while the pressure was reduced to 0.3 mm. of mercury. Under these temperature and pressure conditions the mixture was stirred for 210 minutes. A polyester was obtained having a reduced specific viscosity of 0.85 dl./g., measured as described in Example 1.

10 kilograms of the polyester granules were introduced into an eccentric tumbling drier and dried for 2 hours at 100° C. under a pressure of 0.2 mm. of mercury. The granules were then subjected to an after-condensation in the solid phase for 9 hours at 240° C. under a pressure of 0.3 mm. of mercury. The polyester obtained had a reduced specific viscosity of 1.45 dl./g. The polyester granules were intensely mixed with 40 grams of boron nitride which had been heated for 8 hours at 1,700° C. and had a particle size below 2 microns. The mixture was melted on a vertical extruder, the melt was homogenized, extruded while cooling with water and granulated. The granules had a reduced specific viscosity of 1.2 dl./g.

The polyester containing the nucleating agent was dried for 2 hours at 100° C. under a pressure of 0.2 mm. in an eccentric tumbling drier and subjected to an after-condensation in the solid phase for 270 minutes at 240° C. under a pressure of 0.2 mm. of mercury. The after-condensed polyester had a reduced specific viscosity of 1.49 dl./g.

Sheets measuring 60 x 60 x 2 mm. were produced from the polyester composition by injection moulding at a temperature of the mould of 140° C. and with a dwell time in the mould of 25 seconds. The sheets had a white color with a slight greyish hue.

EXAMPLE 3

1 kilogram of polyethyleneglycol terephthalate having a reduced specific viscosity of 1.43 dl./g., measured under the conditions indicated in Example 1, were intensely mixed with 4 grams of boron nitride which had been heated for 8 hours at 1,700° C. and had a particle size below 2 microns and 10 grams of sodium alkane-sulfonate ($C_{13}$–$C_{18}$). The mixture was processed as described in Example 1. The polyester composition obtained had a reduced specific viscosity of 1.56 dl./g.

Under the conditions specified in Example 1 sheets were produced from the polyester granules, which sheets had a white color.

EXAMPLE 4

1 kilogram of polyethyleneglycol terephthalate having a reduced specific viscosity of 1.43 dl./g., measured under the conditions described in Example 1, were intensely mixed with 2 grams of boron nitride which had been heated at 1,700° C. and had a particle size below 2 microns and 2 grams of sodium olefin-sulfonate of the formula R—CH=CH—$SO_3$Na in which R represents an alkane radical having 15 to 18 carbon atoms. Under the conditions of Example 1 sheets were produced from the granules. The color of the sheets was white.

EXAMPLE 5

A polyester composition was prepared as described in Example 1, with the exception that, instead of 4 grams of sodium sulfate, 2 grams of sodium p-toluene-sulfonate having a particle size below 10 microns were used. The after-condensed polyester composition had a reduced specific viscosity of 1.51 dl./g. The color of the sheets was white.

EXAMPLE 6

A polyester composition was prepared as described in Example 1 with the exception that, instead of 4 grams of sodium sulfate, 4 grams of the sodium salt of diphenyl-phosphinic acid having a particle size below 10 microns were used. The after-condensed polyester composition had a reduced specific viscosity of 1.43 dl./g. The sheets had the color of light ivory.

EXAMPLE 7

A polyester composition was prepared as described in Example 1 but instead of 4 grams of sodium sulfate, 4 grams of the sodium salt of ethylphosphonic acid having a particle size below 10 microns were used. The after-condensed polyester moulding composition had a reduced specific viscosity of 1.45 dl./g. The sheets had the color of light ivory.

EXAMPLE 8

A polyester composition was prepared as described in Example 1 but instead of 4 grams of sodium sulfate, 4 grams of the sodium salt of di-n-dodecyl-phosphonic acid having a particle size below 10 microns were used. The after-condensed polyester composition had a reduced specific viscosity of 1.41 dl./g., the color of the sheets made therefrom was light ivory.

EXAMPLE 9

A polyester composition was prepared as described in Example 1 with the exception that, instead of 4 grams of sodium sulfate, 4 grams of the disodium salt of phosphoric acid mono-n-dodecyl ester having a particle size below 10 microns were used. The after condensed polyester composition had a reduced specific viscosity of 1.49 dl./g., the sheets had the color of light ivory.

What is claimed is:

1. Thermoplastic moulding compositions consisting of a mixture of:
  (a) linear saturated polyesters of aromatic dicarboxylic acids and optionally up to 10% by weight of aliphatic dicarboxylic acids, calculated on the total amount of carboxylic acids, with saturated aliphatic or cycloaliphatic diols,
  (b) 0.005 to 5% by weight of boron nitride, calculated on the total mixture, and
  (c) at least one compound containing S—O—Na groups selected from the group consisting of sodium sulfate, sodium alkane-sulfonates, sodiumolefin-sulfonates, sodium aryl-sulfonates, and sodium aralkyl-sulfonates or P—O—Na groups selected from the group consisting of alkyl-phosphinic acids, cycloalkylphosphinic acids, arylphosphinic acids, arylphosphonic acids, alkylphosphonic acids, cycloalkylphosphonic acids, a monoalkyl ester of phosphorous acid, a monocycloalkyl ester of phosphorous acid, a monoaryl ester of phosphorous acid, a dialkyl ester of phosphoric acid, a dicycloalkyl ester of phosphoric acid, a diaryl ester of phosphoric acid, or a disodium salt of a phosphoric acid monoalkyl ester, a monocycloalkyl ester of phosphoric acid or a monoaryl ester of phosphoric acid in its chemical structure in an amount of from 0.005 to 5% by weight, calculated on the total mixture.

2. A thermoplastic moulding composition as claimed in claim 1, wherein the linear saturated polyester is polyethylene glycol terephthalate.

3. A thermoplastic moulding composition as claimed in claim 1, wherein the linear saturated polyester is polycyclohexane-1,4-dimethylol terephthalate.

4. A thermoplastic moulding composition as claimed in claim 1, wherein the linear saturated polyester has a reduced specific viscosity of from 0.7 to 2.0 dl./g., measured at 25° C. in a 1% solution in a mixture of 60 parts by weight of phenol and 40 parts by weight of tetrachloroethane.

5. A thermoplastic moulding composition as claimed in claim 1, containing 0.05 to 0.5% by weight of boron nitride, calculated on the total mixture.

6. A thermoplastic moulding composition as claimed in claim 1, wherein the boron nitride has a particle size below 10 microns.

7. A thermoplastic moulding composition as claimed in claim 1, wherein the boron nitride, prior to being added to the composition, is heated for 1 hour to 24 hours at a temperature ranging from 800° C. to the temperature of sublimation of the said boron nitride.

8. A thermoplastic moulding composition as claimed in claim 1, wherein the compound containing S—O—Na groups is a compound with $SO_3$Na groups.

9. A thermoplastic moulding composition as claimed in claim 1, wherein a sodium alkane-sulfonate in which the alkyl radical has 1 to 30 carbon atoms is used.

10. A thermoplastic moulding composition as claimed in claim 1, wherein a sodium olefin-sulfonate in which the olefin radical has 1 to 30 carbon atoms is used.

11. A thermoplastic moulding composition as claimed in claim 1, wherein the compound containing S—O—Na groups is a sodium salt of benzenesulfonic acid, naphthalene-1-sulfonic acid, naphthalene-2, -disulfonic acid, diphenyl-4-sulfonic acid, diphenyl ether-4-sulfonic acid, p-toluene-sulfonic acid, 1,3-xylene-4-sulfonic acid or n-dodecyl-benzene-4-sulfonic acid.

12. A thermoplastic moulding composition as claimed in claim 1, wherein the phosphorous-containing compounds contain alkyl radicals with 1 to 30 carbon atoms.

13. Shaped articles made from the thermoplastic moulding compositions claimed in claim 1.

References Cited

UNITED STATES PATENTS

| 3,432,472 | 3/1969 | Caldwell | 260—75 S |
| 3,528,947 | 9/1970 | Lappin et al. | 260—75 S |
| 3,310,532 | 3/1967 | Kazama et al. | 260—45.7 S |
| 3,330,802 | 7/1967 | Ciceri et al. | 260—45.7 P |
| 3,441,540 | 4/1969 | Müller et al. | 260—45.75 R |
| 3,525,706 | 8/1970 | Calkins | 260—45.7 P |
| 3,576,793 | 4/1971 | Carroll et al. | 260—45.7 P |

FOREIGN PATENTS

| 226,457 | 1/1960 | Australia | 260—75.5 S |
| 951,213 | 3/1964 | Great Britain | 260—75.5 P |

WILLIAM SHORT, Primary Examiner

E. WOODBERRY, Assistant Examiner

U.S. Cl. X.R.

260—45.7 R, S, P, 75 R, P, S, T, 873